United States Patent [19]

Scharpenberg

[11] Patent Number: 4,735,766
[45] Date of Patent: Apr. 5, 1988

[54] METHOD AND APPARATUS FOR TESTING VERTICALLY EXTENDING FUEL RODS OF WATER-COOLED NUCLEAR REACTORS WHICH ARE COMBINED IN A FUEL ROD CLUSTER

[75] Inventor: Rainer Scharpenberg, Im Krappenklingen, Fed. Rep. of Germany

[73] Assignee: Brown, Boveri Reaktor GmbH, Mannheim, Fed. Rep. of Germany

[21] Appl. No.: 882,225

[22] Filed: Jul. 7, 1986

[30] Foreign Application Priority Data

Jul. 12, 1985 [DE] Fed. Rep. of Germany ....... 3524909

[51] Int. Cl.$^4$ .................... G21C 17/06; G21C 19/10
[52] U.S. Cl. ..................... 376/245; 376/261; 294/906; 269/69
[58] Field of Search ............... 376/261, 260, 249, 245, 376/248, 258, 463, 272, 271, 268, 264; 294/906; 269/25, 69, 256, 909

[56] References Cited

U.S. PATENT DOCUMENTS

| | | | |
|---|---|---|---|
| 3,914,613 | 10/1975 | Shallenberger et al. | 376/261 |
| 4,036,686 | 7/1977 | Weilbacher et al. | 376/251 |
| 4,139,778 | 2/1979 | Raymond | 376/272 |
| 4,197,652 | 4/1980 | Qurnell et al. | 376/245 |
| 4,446,098 | 5/1984 | Pomaibo et al. | 376/272 |
| 4,605,531 | 8/1986 | Leseur et al. | 376/251 |
| 4,637,912 | 1/1987 | Scharpenberg et al. | 376/245 |
| 4,655,993 | 4/1987 | Scharpenberg | 376/245 |

FOREIGN PATENT DOCUMENTS 3419765 10/1985 Fed. Rep. of Germany ...... 376/245

OTHER PUBLICATIONS

"US-Prüfung von Brennelementen Während des BE-Wechsels", *Atomwirtschaft*, Carbon et al., 3-1985, pp. 145-147.

Primary Examiner—Deborah L. Kyle
Assistant Examiner—Daniel Wasil
Attorney, Agent, or Firm—Herbert L. Lerner; Laurence A. Greenberg

[57] ABSTRACT

A method for testing vertically disposed fuel rods combined in fuel rod clusters or fuel assemblies in rack positions of a fuel assembly rack of a water-cooled nuclear reactor includes inserting a holding device into first and second unoccupied rack positions while maintaining an unoccupied third rack position therebetween, inserting a fuel assembly to be tested into the third rack position with a lifting device, locking the fuel assembly to the holding device while the fuel assembly is in the third rack position, moving the fuel assembly vertically upward with the holding device, interrupting the upward motion of the fuel assembly, subsequently inserting a probe with a test device into spaces between the fuel rods in a testing operation, moving the fuel assembly vertically downward with the holding device after completing the testing operation until the fuel assembly is deposited in the third rack position, removing the fuel assembly with the lifting device, and depositing another fuel assembly to be tested into the third rack position.

10 Claims, 5 Drawing Sheets

METHOD AND APPARATUS FOR TESTING VERTICALLY EXTENDING FUEL RODS OF WATER-COOLED NUCLEAR REACTORS WHICH ARE COMBINED IN A FUEL ROD CLUSTER

The invention relates to a method and apparatus for testing vertically extending fuel rods of water-cooled nuclear reactors which are combined in a fuel rod cluster, wherein a probe carrying testing devices is inserted into spaces between the fuel rods and the fuel rod cluster, which is also known as a fuel assembly, is held by a lifting device.

Such a method is known from German Published, Non-Prosecuted Application DE-OS No. 3,337,084, corresponding to U.S. Pat. No. 4,655,993. As can be seen from FIG. 1 of that publication, the fuel assembly must be held by a lifting device support even during testing with the probes. The lifting device, therefore, is not available for other tasks in the nuclear power generating station.

In an apparatus for inspecting fuel assemblies described in German Published, Non-Prosecuted Application DE-OS No. 25 58 631, corrsponding to U.S. Pat. No. 4,036,686, the lifting device of the nuclear power generating station is not needed during the testing operation. However, it has a strong construction and therefore a relatively large weight, because it must support the fuel assembly as well as the manipulator for the testing devices. Special holders are therefore required in the fuel assembly storage pit for such an apparatus, which are often not available or can only be installed at great cost.

Because of the large weight which such apparatus has together with the fuel assembly to be supported thereby, the use of the apparatus requires approval by the technical supervising authority since neither the walls of the fuel assembly storage pit nor the storage rack surface are constructed for such loads.

It is accordingly an object of the invention to provide a method and apparatus for testing vertically extending fuel rods of water-cooled nuclear reactors which are combined in a fuel rod cluster, which overcomes the hereinafore-mentioned disadvantages of the heretofore-known methods and devices of this general type, which requires no lifting device of the nuclear power generating plant during the testing of a fuel assembly, which permits the testing of the fuel assembly in several planes and which nevertheless does not unduly stress the fuel assembly storage pit or the rack for receiving fuel assemblies.

With the foregoing and other objects in view there is provided, in accordance with the invention, a method for testing vertically disposed fuel rods combined in fuel rod clusters or fuel assemblies or elements in rack positions of a fuel assembly rack of a water-cooled nuclear reactor, which comprises inserting a holding device into first and second unoccupied rack positions while maintaining an unoccupied third rack position therebetween, inserting a fuel assembly to be tested into the third rack position with a lifting device of the nuclear power station, locking the fuel assembly in the third rack position with the holding device, moving the fuel assembly vertically upward with the holding device, interrupting the upward motion of the fuel assembly, subsequently inserting a probe with a test device into spaces between the fuel rods in a testing operation, moving the fuel assembly vertically downward with the holding device after completing the testing operation until the fuel assembly is deposited in the third rack position, removing the fuel assembly with the lifting device, and depositing another fuel assembly to be tested into the third rack position.

Since the load is distributed over two rack positions, one rack position is stressed less than when it is acted upon by the weight of a fuel assembly, since the holding device considered alone is lighter than a fuel assembly. The rack can therefore be used as a receptacle for the holding device without difficulty. The method can be carried out with a storage rack for fuel assemblies inserted into a reactor vessel after the reactor vessel cover is removed.

In order to carry out the method, there is provided an apparatus for testing vertically disposed fuel rods combined in fuel rod clusters or fuel assemblies or elements in rack positions of a fuel assembly rack of a water-cooled nuclear reactor, comprising a holding device formed of two lifting columns having bodies to be inserted into first and second respective unoccupied rack positions maintaining an unoccupied third rack position therebetween, the bodies having outer contours adapted to the cross section of a rack position, lower ends to be supported by the bottom of a rack position and upper ends, a cross piece interconnecting the upper ends of the bodies, the cross piece having a passage opening formed therein in alignment with the third rack position through which a fuel assembly is inserted into the third rack position, means for locking the fuel assembly to the cross piece, the lifting columns including means for moving the cross piece and the fuel assembly vertically upward and downward, a probe with a test device, and means for inserting the test device into spaces between the fuel rods above the rack. The support, the centering and the vertical movement of a fuel assembly are thereby controlled in a simple and reliable manner.

In accordance with another feature of the invention, the bodies have peripheral surfaces, and only a portion of the peripheral surfaces are matched to the contour of a rack position. In this way the contact points between the body of the lifting column and the wall of a rack position are limited to the necessary degree.

In accordance with an added feature of the invention, the cross piece includes a turntable recessed therein, the turntable having the passage opening formed in the center thereof, and including a drive disposed on the cross piece and engaged with the turntable, means for bracing the turntable in axial direction, and means for fixing the turntable in place relative to the cross piece. This is done so that the test probe can be inserted from another side into the spaces between the fuel rods.

In accordance with an additional feature of the invention, the locking means are disposed on the turntable.

In accordance with a further feature of the invention, the fuel assembly has a post with a recess formed therein, the turntable has a projection formed therein, and the locking means are in the form of a magnetic locking device having a lifting magnet and a support rod with a free end inserted into the recess and a region facing the lifting magnet being braced against the projection. An unintended opening of the lock is therefore precluded because the restoring force of the lifting magnet is substantially smaller than the transverse force due to the fuel assembly.

In accordance with again another feature of the invention, the lower ends of the bodies have the shape of a fuel assembly.

The bottom of a rack position is therefore loaded by the lifting columns at the same points as if a fuel assembly were inserted into a rack position.

In accordance with again an added feature of the invention, there is provided a support connected to the bodies, and a manipulator supported on the support. Since the lifting columns also represent the support elements for the fuel assembly, the position accuracy between a fuel assembly and the test probe can be improved in this way.

In accordance with still a further feature of the invention, the support has a free end braced against another fixed point. By using another fixed point, the support can be made with a more light-weight type of construction.

In accordance with a concomitant feature of the invention, there is provided at least one other holding device with bodies, the bodies of both of the holding devices being disposed in a row having first and last bodies supporting said support. With this embodiment, the time required for testing all fuel assemblies of a nuclear charge is substantially reduced.

Other features which are considered as characteristic for the invention are set forth in the appended claims.

Although the invention is illustrated and described herein as embodied in a method and apparatus for testing vertically extending fuel rods of water-cooled nuclear reactors which are combined in a fuel rod cluster, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
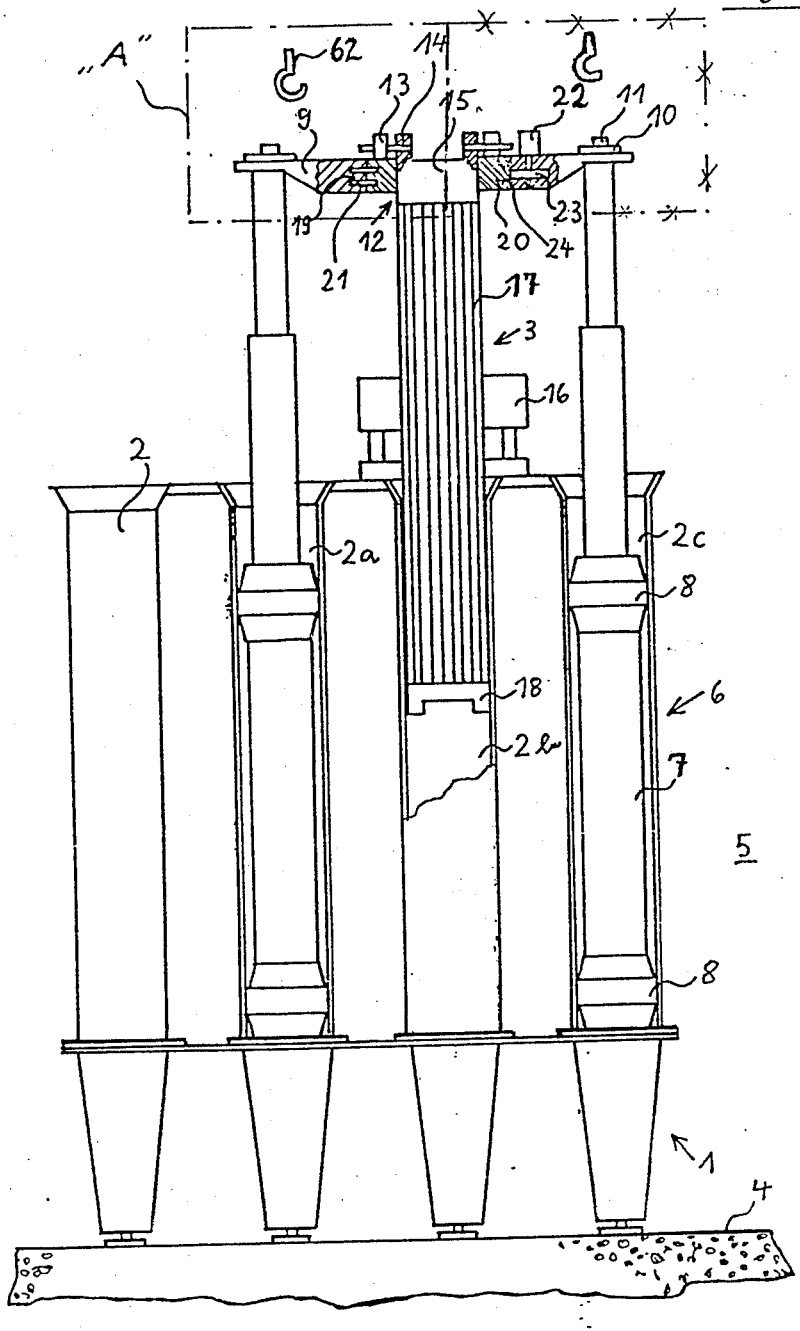
FIG. 1 is a fragmentary, diagrammatic view of a fuel assembly storage pit with a holding device and a fuel assembly which is partly broken away.
Figure 2:
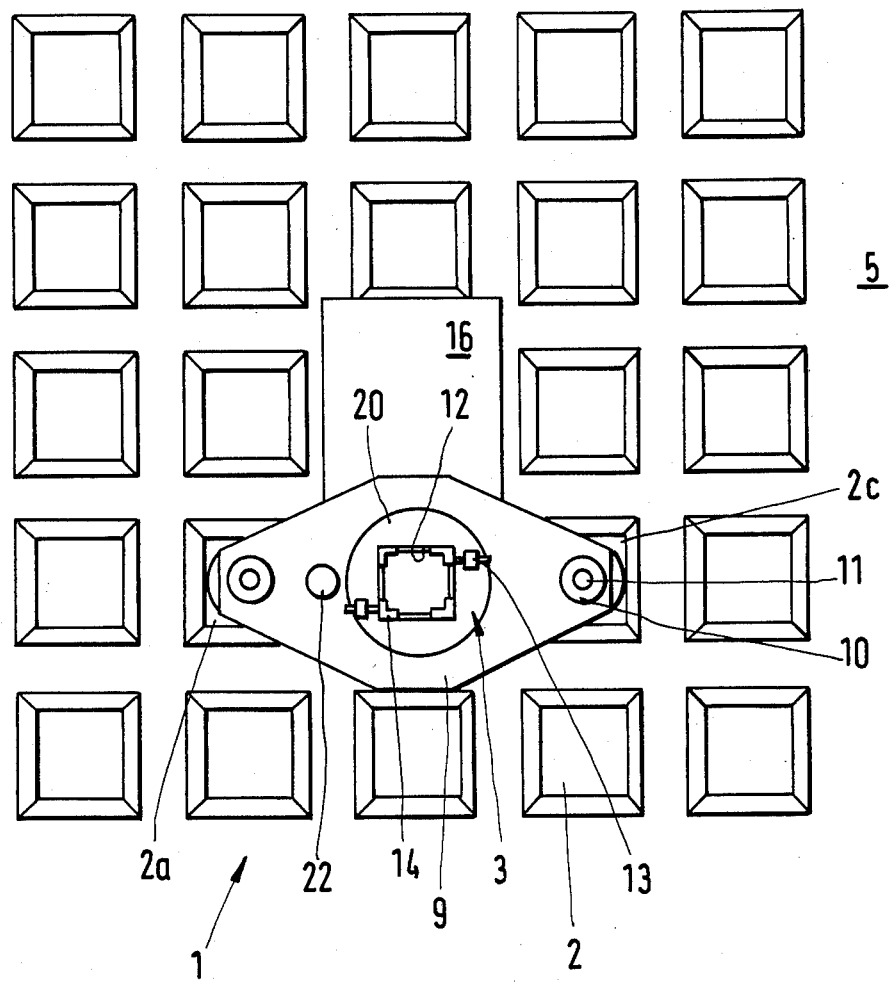
FIG. 2 is a top-plan view of FIG. 1.

Referring now to the figures of the drawings in detail and first, particularly, to FIGS. 1 and 2 thereof, there is seen a rack 1 with a large number of rack positions 2 for receiving vertically extending fuel assemblies 3 of water-cooled nuclear reactors. The rack is deposited at the bottom 4 of a water-filled pit 5. Three rack positions 2a, 2b, 2c in a row are left empty for carrying out the method. A lifting column 6 which is advantageously in the form of a telescoping hydraulic system, is inserted into each of the rack positions 2a and 2c, leaving the rack position 2b empty. The two lifting columns 6 form a holding device. A body 7 of the lifting column 6 is equipped with guiding pieces 8 at end regions thereof. The cross section of the guiding pieces is adapted to the cross section of a rack position in such a manner that they serve for guiding and centering the lifting column. The part of the lifting column making contact with the bottom of the rack position is constructed like the base of a fuel assembly, so that the rack 1 is only loaded at the points which would also be engaged by a fuel assembly. The free ends of the upper sliding part of the lifting columns 6 constructed as telescoping hydraulic systems, are connected to each other by a cross piece 9 and are secured by a nut 11 with the interposition of a washer 10. A passage opening 12 which is provided at the center of the cross piece, is adapted to the cross section of a fuel assembly 3 and permits a fuel assembly 3 to be brought through. Prior to the start of the test operation, the telescoping hydraulic system is inserted until the cross piece 9 makes contact with the upper surface of the rack 1. Hooks 62 forming a lifting device of the nuclear power generating station insert a fuel assembly 3 to be tested through the passage opening 12 of the cross piece 9 into the unoccupied rack position 2b located between the lifting columns 6 which are constructed as telescoping hydraulic systems. The lifting device is pulled off and can be used elsewhere in the nuclear power station. A magnetic locking device 13 disposed on the upper surface of the cross piece is then brought into engagement with at least two posts 14 of a fuel assembly head 15. The fuel assembly 3 is then lifted by means of the lifting columns and is stopped at different levels and tested with a manipulator 16 which is locked on the rack 1 and carries a testing probe. The tests are conducted by introducing the probe into the spaces between individual fuel rods 17. If the fuel assembly 3 is to be additionally tested from another side, the telescoping hydraulic system is extended until a base 18 of the fuel assembly is disposed above the upper edge of the rack 1. After disengaging an axial lock 19, a turntable 20 integrated in the cross piece 9 can be rotated together with the fuel assembly 3. The axial locking device 19 is formed of pneumatic cylinders 21 which are disposed in tandem, are fastened in the cross piece and have pistons which can be inserted into corresponding recesses in the turntable 20. In order to execute the rotary motion of the turntable 20, a drive 22 is disposed on the cross piece 9 and is in engagement with a gear periphery of the turntable 20 through a gear 23. The turntable 20 is supported in the cross piece 9 on a projection 24. In the construction of the device utilizing the turntable, the passage opening 12 for a fuel assembly 3 is provided at the center of the turntable. The turntable therefore also carries the magnetic locking device 13. After the test is completed, the telescopic hydraulic system of the lifting column 6 with the fuel assembly is lowered until it is seated at the bottom of the rack position. The magnetic lock is disengaged, the fuel assembly 3 is removed by the lifting device 62 of the nuclear power station, and the next fuel assembly to be tested can be inserted.

Figure 3:
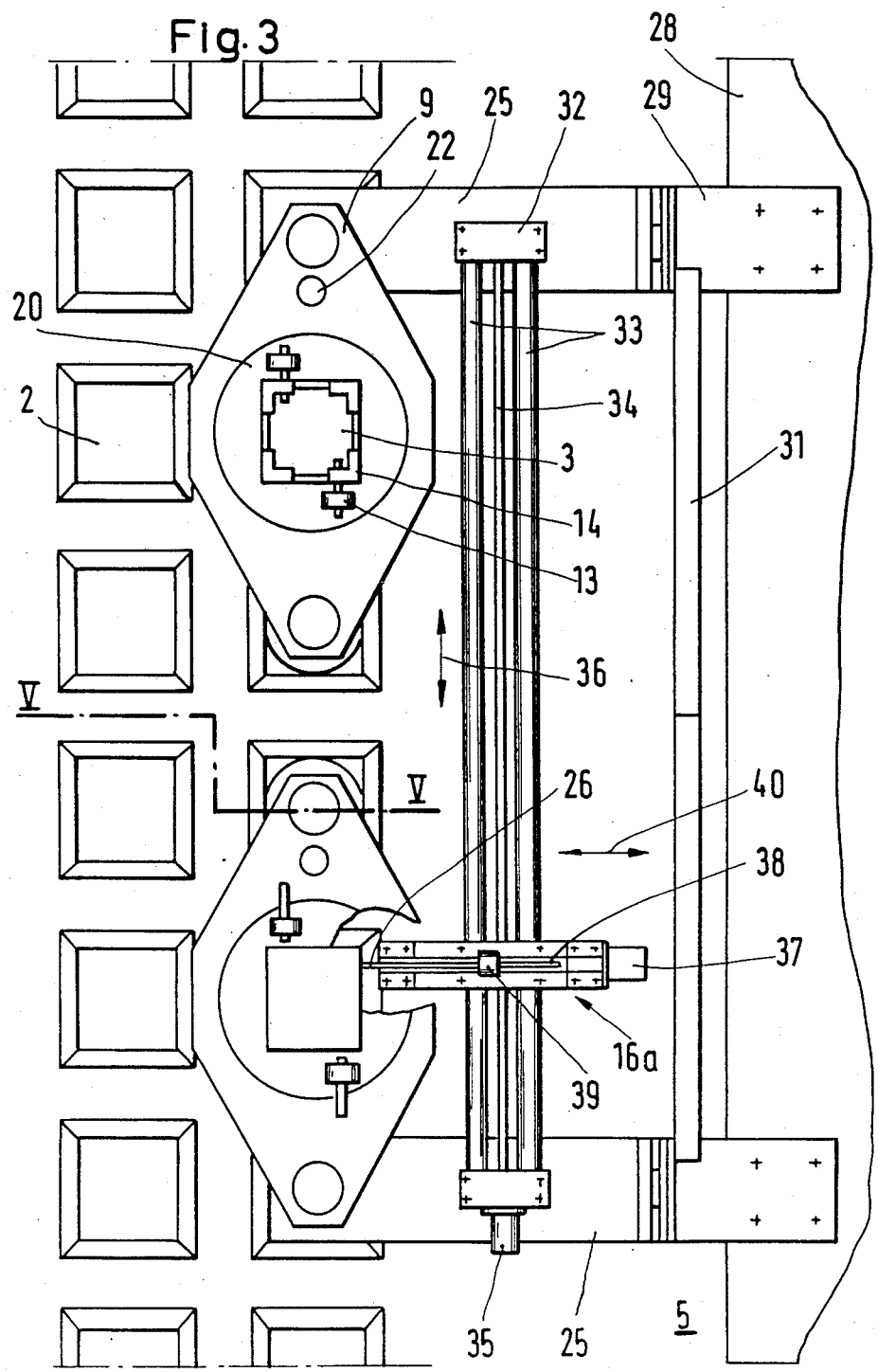
FIG. 3 is a fragmentary, top-plan view of another embodiment of the holding device.
Figure 4:
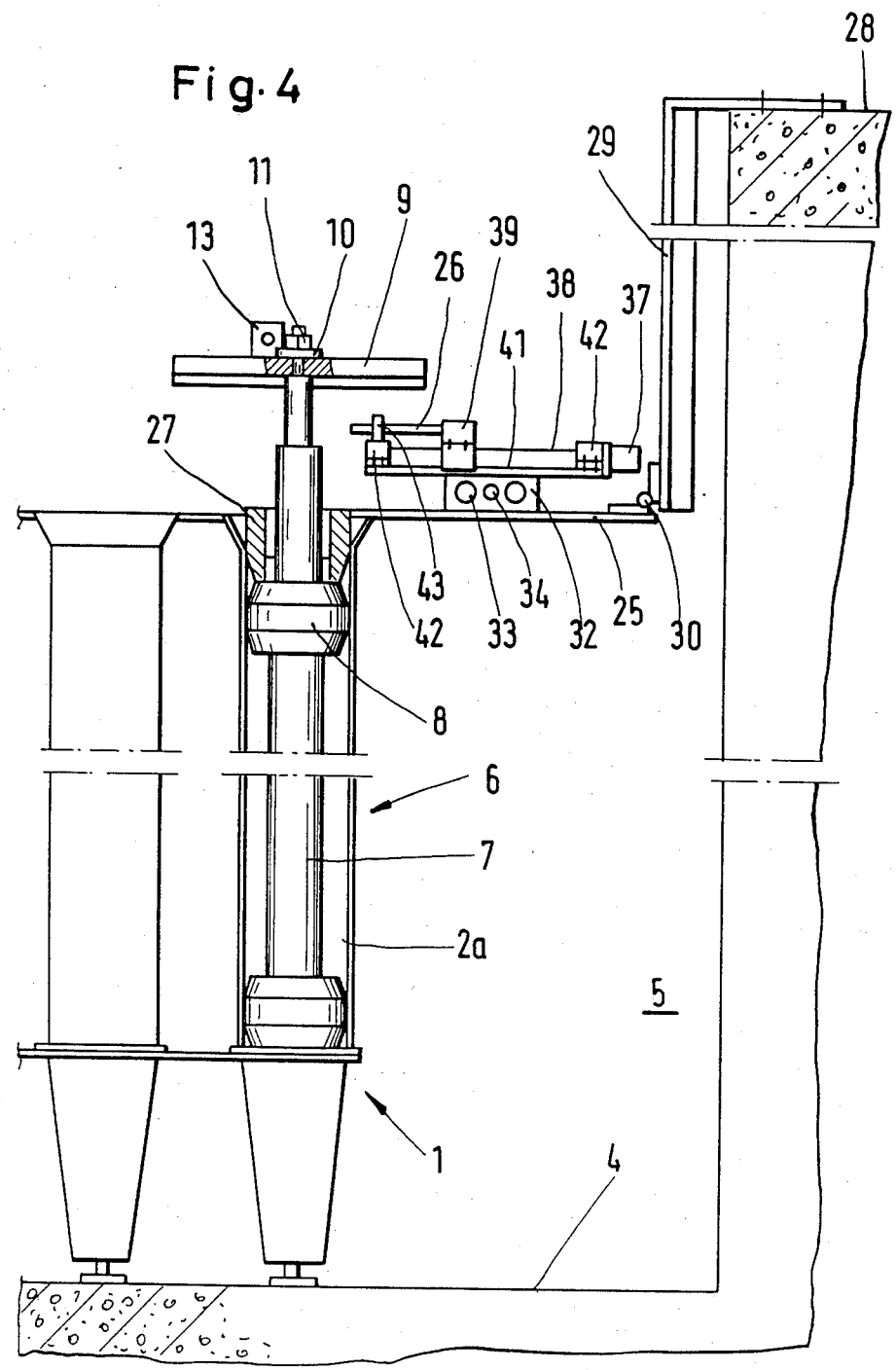
FIG. 4 is a partly cross-sectional view taken along the line V—V in FIG. 3.

According to the embodiment shown in FIGS. 3 and 4, two holding devices are disposed in a row, so that six rack positions 2 are occupied. The lifting columns 6 disposed on the outside of the row are fastened to supports 25 for receiving a manipulator 16a, which in turn carry test probes 26. In order to fasten a support, a support is braced against the upper end of a spacer 27 which is associated with the upwardly-pointing guiding piece 8 of the lifting column. A bracket 29 is provided in order to stabilize the support 25, which may be necessary. The bracket is fastened at the edge of the pit 28 and is connected to the support 25 by a hinge 30. A strut 37 stiffens the bracket. The hinge facilitates the assembly and disassembly as well as the handling of the support 25. Two guide rods 33 and a spindle 34 are fastened to the support 25 by holders 32. The spindle 34 is set in rotation by means of a drive motor 35 and moves the manipulator 16a in the direction of an arrow 36. A drive motor 37 fastened to the manipulator 16a moves a probe carrier 39 together with the probe 26 in the direction of an arrow 40. This is also accomplished by means of a spindle 38 in connection with a guide rod 41. A holder 42 for supporting the spindle 38 and the guide rod 41 is equipped with a guiding device 43 which guides and supports the probe 26 during its travel into the spaces between the fuel rods. The disposition of two holding devices in tandem permits the loading or unloading of one holding device with a fuel assembly while the other fuel assembly is being tested, which leads to an overall acceleration of the testing operation.

Figure 5:
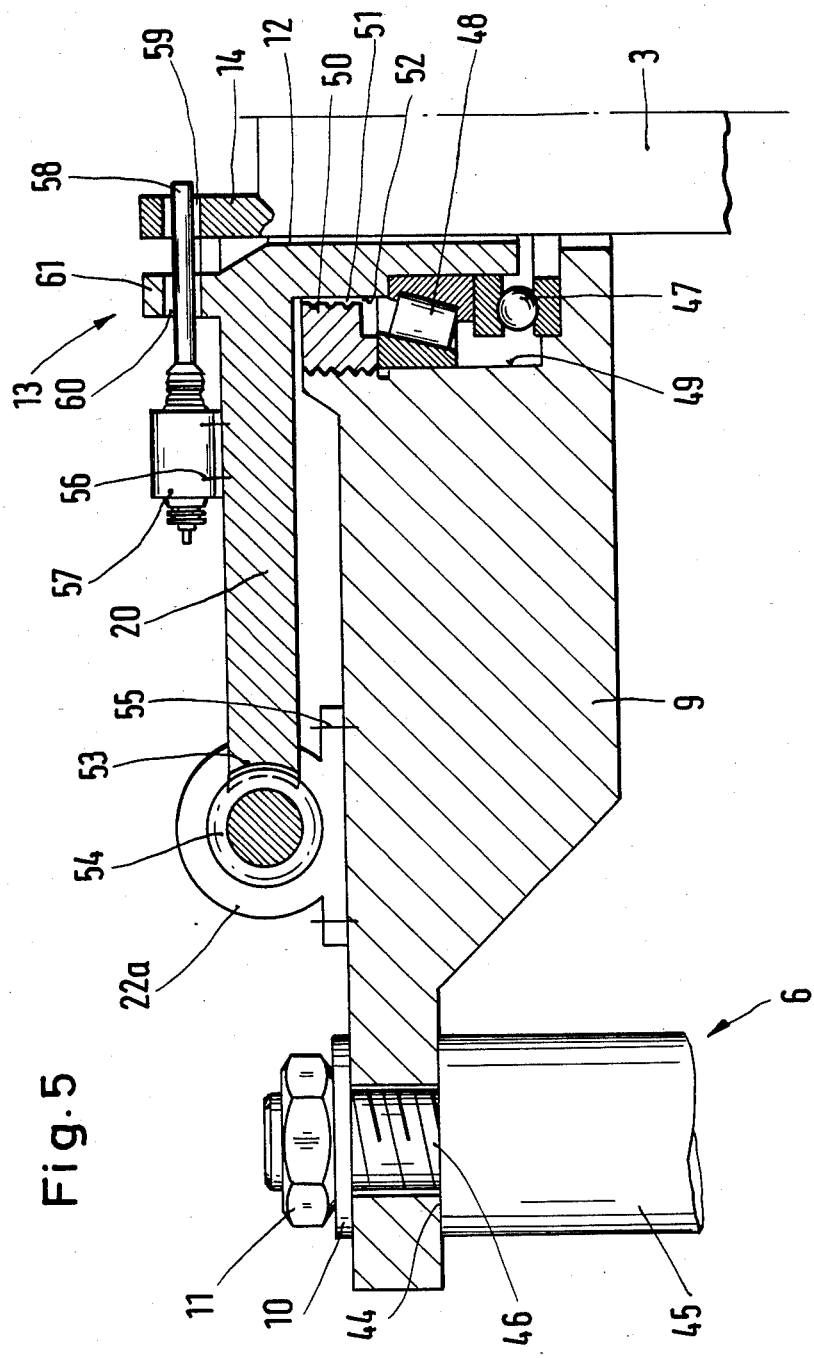
FIG. 5 is an enlarged view of the area "A" of FIG. 1, illustrating another embodiment of the invention.

Another embodiment of the cross piece 9 regarding the ability thereof for receiving fuel assemblies, can be seen in FIG. 5 which shows the enlarged region "A" of FIG. 1. The cross piece 9 rests on a shoulder 14 of a free end of a lifting rod 45 of the lifting column 6. A threaded bolt 46 forming the free end of the lifting rod passes through the cross piece 9, so that the cross piece can be secured by means of the nut 11 with the interposition of the washer 10. The turntable 20 is supported with the interposition of an axial ball bearing 47 and an angular ball bearing 48 on the projection 24 of the cross piece 9. Besides its support function in the vertical direction, the angular ball bearing 48 also serves for the radial guidance of the turntable relative to a surface or wall 49 of a hole formed in the cross piece 9. In its upper region, the surface or wall 49 of the hole is provided with a thread. The thread serves for accommodating a threaded ring 50 which is used as an adjustable stop for the angular ball bearing 48. The inner periphery of the threaded ring 50 is provided with sealing elements 51 which come to a stop opposite a shoulder surface 52 of the turntable 20. The outer periphery of the region of the turntable extending parallel to the surface of the cross piece is provided with worm gearing 53, meshing with a worm 54 of a drive 22a. The drive 22a is fastened to the cross piece 9 by screws 55 and permits a rotary motion of the fuel assembly to occur relative to the cross piece if the lifting columns 6 with the fuel assembly 3 are extended so far that the base 18 of the fuel assembly (FIG. 1) is disposed above the upper edge of the rack 1. A lifting magnet 57 fastened to the turntable 20 by means of screws 56 together with a support rod 58 thereof which can be inserted into a recess 59 in a fuel assembly post 14, represent the magnetic locking device 13. Similar to the recess 59 in the post 14, a feedthrough 60 is formed in a projection 61 of the turntable 20. If the fuel assembly is deposited in the rack position 2b, a play of a few tenths of a millimeter between the support rod 58 and the recess 59 or the feedthrough 60 permits easy movement of the support rod relative to the recess 59 or the feedthrough 60. If the process of lifting the fuel assembly takes place by means of the lifting columns with the support rod 58 inserted into the recess 59, the fuel assembly is only supported by the support rods which are braced against the projection 61 of the turntable 20, after the afore-mentioned play between the support rod 58 and the recess 59 or the feedthrough 60 is exceeded. A stressing of the lifting magnet 57 and the screws 56 is thereby avoided. A resilient fastening of the lifting magnet 57 laid out within the framework of the play between the support rod 58 and the feedthrough 59 of the lifting magnet 57 at the turntable 20 aides this advantageous effect. Unintended opening of the magnetic locking device during the lifting process is impossible since the restoring force of the lifting magnet is substantially smaller than the transverse force due to the fuel assembly.

The foregoing is a description corresponding in substance to German Application No. P 35 24 909.9, dated July 12, 1985, the International priority of which is being claimed for the instant application, and which is hereby made part of this application. Any material discrepancies between the foregoing specification and the aforementioned corresponding German application are to be resolved in favor of the latter.

What is claimed:

1. Method for testing vertically disposed fuel rods combined in fuel rod clusters or fuel assemblies in rack positions of a fuel assembly rack of a water-cooled nuclear reactor, which comprises inserting a holding device into first and second unoccupied rack positions while maintaining an unoccupied third rack position therebetween, inserting a fuel assembly to be tested into the third rack position with a lifting device, locking the fuel assembly to the holding device while the fuel assembly is in the third rack position, moving the fuel assembly vertically upward with the holding device, interrupting the upward motion of the fuel assembly, subsequently inserting a probe with a test device into spaces between the fuel rod in a testing operation, moving the fuel assembly vertically downward with the holding device after completing the testing operation until the fuel assembly is deposited in the third rack position, removing the fuel assembly with the lifting device, and depositing another fuel assembly to be tested into the third rack position.

2. Apparatus for testing vertically disposed fuel rods combined in fuel rod clusters or fuel assemblies in rack positions of a fuel assembly rack of a water-cooled nuclear reactor, the apparatus comprising a holding device formed of two lifting columns having bodies to be inserted into first and second respective unoccupied rack positions maintaining an unoccupied third rack position therebetween, said bodies having outer contours adapted to the cross section of a rack position, lower ends to be supported by the bottom of a rack position and upper ends, a cross piece interconnecting said upper ends of said bodies, said cross piece having a passage opening formed therein in alignment with the third rack position through which a fuel assembly is inserted into the third rack position, means for locking the fuel assembly to said cross piece, said lifting columns including means for moving said cross piece and the fuel assembly vertically upward and downward, a probe with a test device, and means for inserting said test device into spaces between the fuel rods above the rack.

3. Apparatus according to claim 2, wherein said bodies have peripheral surfaces, and only a portion of said peripheral surfaces are matched to the contour of a rack position.

4. Apparatus according to claim 2, wherein said cross piece includes a turntable recessed therein, said turntable having said passage opening formed in the center thereof, and including a drive disposed on said cross piece and engaged with said turntable, means for bracing said turntable in axial direction, and means for fixing said turntable in place relative to said cross piece.

5. Apparatus according to claim 4, wherein said locking means are disposed on said turntable.

6. Apparatus according to claim 5, wherein the fuel assembly has a post with a recess formed therein, said turntable has a projection formed thereon, and said locking means are in the form of a magnetic locking device having a lifting magnet and a support rod with a free end inserted into said recess and a region facing said lifting magnet being braced against said projection.

7. Apparatus according to claim 2, wherein said lower ends of said bodies have the shape of a fuel assembly.

8. Apparatus according to claim 2, including a support connected to said bodies, and a manipulator supported on said support.

9. Apparatus according to claim 8, wherein said support has a braced, fixed free end.

10. Apparatus according to claim 8, including at least one other holding device with bodies, said bodies of both of said holding devices being disposed in a row having first and last bodies supporting said support.

* * * * *